United States Patent [19]
Cini et al.

[11] Patent Number: 5,027,250
[45] Date of Patent: * Jun. 25, 1991

[54] ELECTRONIC CIRCUIT WITH A PROTECTION DEVICE AGAINST FLUCTUATIONS IN THE SUPPLY BATTERY VOLTAGE

[75] Inventors: Carlo Cini, Cornaredo; Bruno Murari, Monza, both of Italy

[73] Assignee: SGS-Thomson Microelectronics S.r.l., Agrate Brianza, Italy

[*] Notice: The portion of the term of this patent subsequent to Sep. 18, 2007 has been disclaimed.

[21] Appl. No.: 370,442

[22] Filed: Jun. 23, 1989

[30] Foreign Application Priority Data

Jul. 5, 1988 [IT]  Italy .............................. 21234 A/88

[51] Int. Cl.$^5$ .............................................. H02H 3/24
[52] U.S. Cl. ........................................ 361/90; 361/18; 361/58; 361/84; 307/127
[58] Field of Search .................... 361/58, 56, 111, 18, 361/91, 84, 90; 307/127

[56] References Cited

U.S. PATENT DOCUMENTS

| | | | |
|---|---|---|---|
| 3,512,058 | 5/1970 | Khajezadeh et al. | 357/41 |
| 3,712,995 | 1/1973 | Steudel | 361/56 |
| 4,809,122 | 2/1989 | Fitzner | 361/18 |
| 4,958,251 | 9/1990 | Cini et al. | 361/84 |

*Primary Examiner*—Todd E. DeBoer

[57] ABSTRACT

An electronic circuit with a protection device against fluctuations in the supply battery voltage, being of a type which comprises a MOS power transistor connected between one pole of the battery and an electric load for driving said load to ground, further comprises a pair of Zener diodes connected to each other in a push-pull configuration, between said pole and the gate electrode of the power transistor.

2 Claims, 1 Drawing Sheet

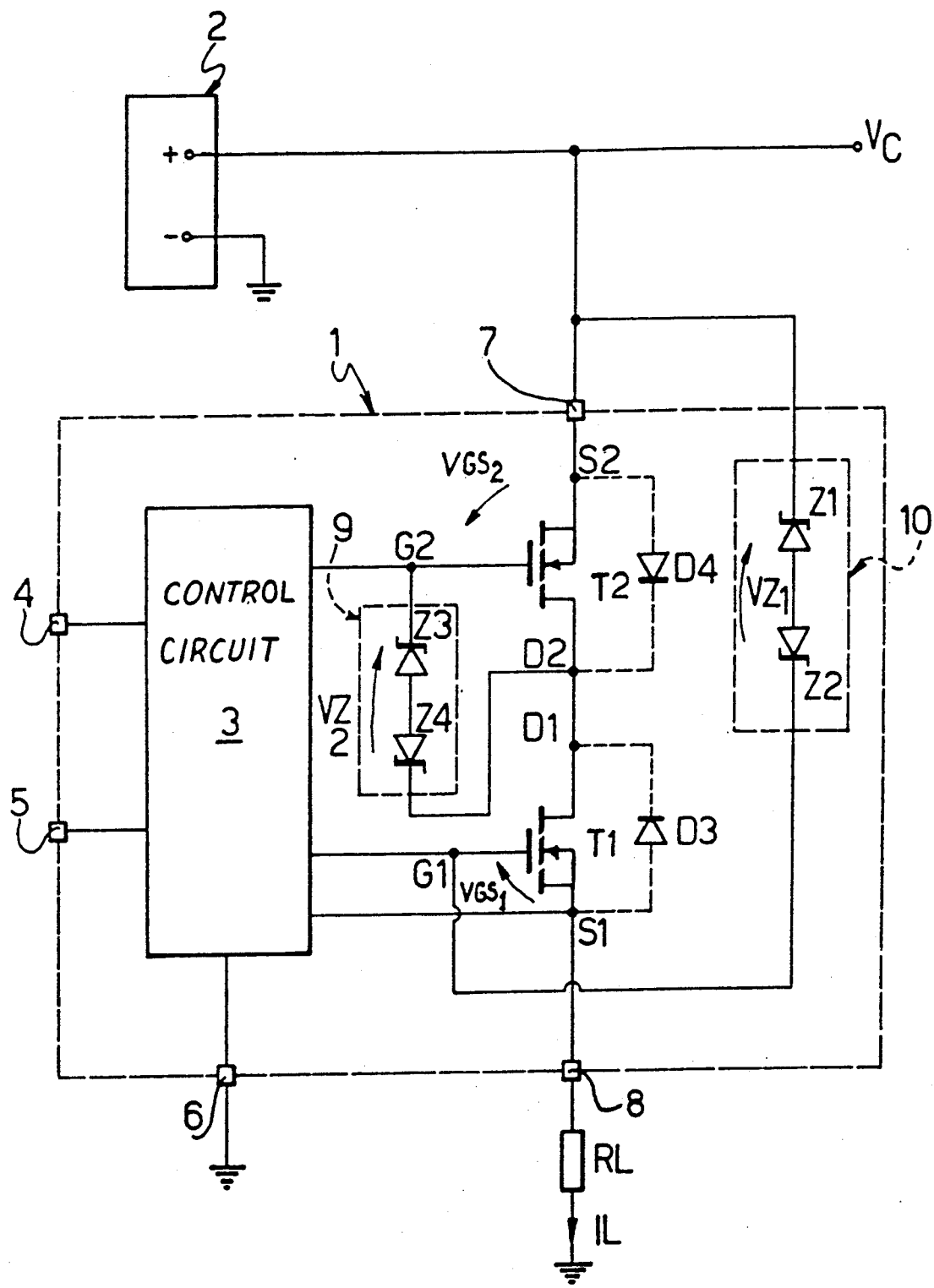

ELECTRONIC CIRCUIT WITH A PROTECTION DEVICE AGAINST FLUCTUATIONS IN THE SUPPLY BATTERY VOLTAGE

DESCRIPTION

This invention relates to an electronic circuit with a protection device against fluctuations in the supply battery voltage, being of a type which comprises a MOS power transistor connected between one pole of said battery and an electric load for driving said load to ground.

BACKGROUND OF INVENTION

As is known, today's passenger cars mount electronic circuits of the integrated kind which are designed to drive such electric loads as lights, electric motors, actuators, and the like, on voltage from a supply battery and through the car's own electric system.

The electric system distribution lines may be affected by sharp voltage fluctuations due to correspondingly sharp changes in the input current to electrical apparatus activated by the user, such as when turning on windshield wipers, air conditioners, or lights, and in relation to the line inductances.

Where overvoltages or undervoltages appear at the power supply, the integrated control circuits for the various electric loads may suffer damage.

To obviate this problem, the use of integrated circuits would be conceivable which can successfully withstand such voltage fluctuations; however, the engineering involved in the manufacture of these circuit types is a substantially expensive one, both in terms of the components and processing required.

Another prior approach consists of connecting, between the integrated circuit and ground, a device which provides protection against said overvoltages; but this also aggravates the manufacturing costs, as well as adding to the cost of assembling the electric system to a car.

SUMMARY OF INVENTION

The technical problem that underlies this invention is to provide an electronic circuit which has such structural and performance characteristics as to adequately guard from voltage fluctuations in the battery supply, thus overcoming the cited drawbacks with which the prior art is beset.

This problem is solved by a circuit of the kind specified above being characterized in that said device comprises a pair of Zener diodes connected to each other in a push-pull configuration between said pole and the gate electrode of said transistor.

The features and advantages of a circuit according to this invention will become apparent from the following detailed description of an emebodiment thereof, to be taken by way of illustration and not of limitation in conjunction with the accompanying drawing.

SUMMARY OF DRAWINGS

The drawing FIGURE shows a circuit according to the invention in diagram form.

DETAILED DESCRIPTION OF PREFERRED EMBODIMENTS

With reference to the drawing view, the numeral 1 generally and schematically denotes an electronic circuit incorporating a protection device 10 against fluctuations in the voltage from a supply battery 2.

The circuit 1 is of the integrated type and comprises a control circuit portion 3, known per se, which is connected to an input pin 4 and a pair of output pins 5 and 6, with the pin 6 connected to ground.

The circuit 1 includes a further input pin 7 which is connected to a positive supply pole Vc of the battery 2, and a further output pin 8 which is connected to one end of a resistor RL having the other end connected to ground.

That resistor RL is illustrative of an electric load driven to ground via the circuit 1.

The circuit 1 includes a power transistor T1 of the enhancement, N-channel MOS type, which has its gate G1 and source S1 connected to the circuit portion 3. The source S1 is also connected to drive the load RL through the output pin 8.

Between the source S1 and drain D1 of the transistor T1 is an inherent diode D3 which is forward biased toward the source S1.

A second N-channel, MOS-type power transistor T2 is incorporated to the circuit 1, with its source S2 and drain D2 electrodes respectively connected to the positive pole VC, via the input pin 7, and the drain D1 of the first transistor T1.

The gate G2 of the second transistor T2 is in turn connected to the circuit portion 3.

An inherent diode D4 intervenes between the source S2 and the drain D2 of the second transistor T2, and is forward biased toward the source S2.

In accordance with this invention, the protection device 10 comprises a pair of back-to-back diodes Z1 and Z2 of the Zener type which are connected to each other in a push-pull configuration, between the positive pole Vc and the gate G1 of the first transistor T1. A maximum positive voltage Vz1 of about 50 Volts appears across that device 10.

The second transistor is also provided with a protection device 9 formed of two back-to-back diodes Z3 and Z4 of the Zener type which are interconnected in a push-pull configuration, between the gate G2 and the drain D2 of the transistor T2. This second-mentioned device 9 has a maximum positive voltage drop Vz2 thereacross which may be of 10 Volts, for example.

When the voltage level between the gate G1 of the first transistor and the positive pole Vc, determined by the control circuit 3, is equal to the sum of the voltage drop Vz1 across the device 10 plus the voltage drop Vgs1 between the gate and the source of the first transistor T1, the latter will become conductive and operate in quite a similar manner to a Zener power diode.

With the circuit 1 in operation, a current IL flows through the load RL which is supplied from the first transistor T1 via the second, protection transistor T2.

Where the drain-to-gate voltage of the second transistor T2 equals in negative value the sum of the voltage drop Vz2 plus the voltage drop Vgs2 between the gate G2 and source S2, it will be the second transistor that becomes operative as a Zener power diode.

Accordingly, the provisions by this invention allow a component to be implemented in integrated circuit form which is the equivalent of a doubled power Zener capable of limiting positive or negative voltage surges to the circuit 1 without raising the overall cost of the integrated circuit.

Thus, the circuit of this invention has a major advantage in that it can protect itself against possible overvoltages in the supply from the battery to which it is connected, while also protecting the electric load driven by it.

This circuit, moreover, is structurally quite simple and implementable as an integrated circuit for a low manufacturing cost.

We claim:

1. An electronic circuit with a protection device against fluctuations in the supply battery voltage, comprising:

(a) a first MOS power transistor connected in series with an electric load between one pole of said battery and ground for driving said load,
(b) a first pair of Zener diodes connected back-to-back to each other between said pole and the gate electrode of said first transistor,
(c) a second MOS transistor connected between said pole and the first transistor and incorporating a protection device formed of a second pair of Zener diodes connected back-to-back to each other between the gate and the drain of said second transistor.

2. A circuit according to claim 1, wherein said second transistor is a power transistor.

* * * * *